(12) United States Patent
Dassanayake et al.

(10) Patent No.: US 9,163,819 B2
(45) Date of Patent: Oct. 20, 2015

(54) LIGHT ASSEMBLY WITH A HEAT DISSIPATION LAYER

(71) Applicant: eLumigen LLC, Auburn Hills, MI (US)

(72) Inventors: Mahendra Dassanayake, Bloomfield Hills, MI (US); Gennaro Fedele, West Bloomfield, MI (US); Srini De Mel, Northville, MI (US)

(73) Assignee: ELUMIGEN, LLC, Auburn Hills, MI (US)

( * ) Notice: Subject to any disclaimer, the term of this patent is extended or adjusted under 35 U.S.C. 154(b) by 0 days.

(21) Appl. No.: 13/962,424

(22) Filed: Aug. 8, 2013

(65) Prior Publication Data

US 2014/0043808 A1 Feb. 13, 2014

Related U.S. Application Data

(60) Provisional application No. 61/681,945, filed on Aug. 10, 2012.

(51) Int. Cl.
*F21V 29/00* (2015.01)
*F21V 9/00* (2015.01)
(Continued)

(52) U.S. Cl.
CPC ............... *F21V 29/002* (2013.01); *F21K 9/135* (2013.01); *F21V 3/04* (2013.01); *F21V 3/0472* (2013.01);
(Continued)

(58) Field of Classification Search
CPC ............... F21V 3/00; F21V 3/04; F21V 7/00; F21V 5/04; F21V 29/004; F21V 15/011; F21V 29/2206; F21V 29/20; F21V 29/22; F21V 9/08; F21V 3/0472; F21V 13/02; F21V 11/00; F21V 29/002; F21V 29/006; F21V 29/75; F21V 29/83; F21V 29/773; F21V 29/713; F21V 29/08; F21V 17/02; F21V 17/16; F21V 29/506; F21V 69/00; F21V 23/026; F21V 7/009; F21V 7/04; F21V 7/10; F21V 7/09; F21S 2/00; F21Y 101/02; F21Y 2101/02; F21Y 2103/02; F21K 9/50; F21K 9/00; F21K 9/90; F21K 9/10; F21K 9/135; F21K 9/137; F21K 9/52; F21K 9/1355; H01L 2924/0002; H01L 2224/45099; H01L 2933/0091; H01L 33/502; H01L 33/641; H01L 33/507; H01L 33/50; H01L 33/60; B29C 2045/1601; B29C 70/72; E04F 15/08; C08L 69/00; C05K 5/14; C09D 5/34; D04H 3/007; D04H 3/16
USPC ................. 362/235, 230, 234, 264, 363, 373, 362/311.02, 311.01
See application file for complete search history.

(56) References Cited

U.S. PATENT DOCUMENTS 2,050,151 A * 8/1936 Baumer ........................ 362/161
4,122,142 A * 10/1978 Lawrence et al. ............. 264/522
(Continued)

FOREIGN PATENT DOCUMENTS

DE 102010043918 5/2012
EP 2458266 5/2012
(Continued)

*Primary Examiner* — Jason Moon Han
*Assistant Examiner* — Omar Rojas Cadima
(74) *Attorney, Agent, or Firm* — Harness, Dickey & Pierce, P.L.C.

(57) ABSTRACT

A light assembly includes a light source circuit board, a plurality of light sources disposed on the light source circuit board, a housing thermally coupled to the light source circuit board and a lens cap assembly comprising a lens cap and a heat dissipation layer. The heat dissipated layer distributes heat from the light source circuit board through the lens cap and external to the light assembly.

22 Claims, 10 Drawing Sheets

(51) Int. Cl.
  *F21K 99/00* (2010.01)
  *F21V 3/04* (2006.01)
  *F21V 29/506* (2015.01)
  *F21Y 103/02* (2006.01)

(52) U.S. Cl.
  CPC ................ *F21V 9/00* (2013.01); *F21V 29/004* (2013.01); *F21V 29/506* (2015.01); *F21Y 2103/02* (2013.01)

(56) References Cited

U.S. PATENT DOCUMENTS

| | | | |
|---|---|---|---|
| 4,393,323 A * | 7/1983 | Hubner | 313/110 |
| 5,083,251 A * | 1/1992 | Parker | 362/255 |
| 7,440,153 B2 * | 10/2008 | Lee et al. | 359/15 |
| 2009/0257220 A1 * | 10/2009 | Lenk et al. | 362/186 |
| 2010/0002451 A1 * | 1/2010 | Reynolds | 362/363 |
| 2010/0271836 A1 * | 10/2010 | Bakk | 362/547 |
| 2010/0301729 A1 * | 12/2010 | Simon et al. | 313/46 |
| 2011/0044065 A1 * | 2/2011 | Ohtani et al. | 362/487 |
| 2012/0087104 A1 * | 4/2012 | Dai et al. | 362/84 |
| 2012/0133263 A1 | 5/2012 | Yang et al. | |
| 2012/0134158 A1 | 5/2012 | Yang et al. | |
| 2012/0236573 A1 | 9/2012 | Yamamoto et al. | |
| 2013/0229801 A1 | 9/2013 | Breidenassel et al. | |

FOREIGN PATENT DOCUMENTS

| | | |
|---|---|---|
| JP | 2012-99297 | 5/2012 |
| WO | WO 2011/070854 | 6/2011 |

* cited by examiner

LIGHT ASSEMBLY WITH A HEAT DISSIPATION LAYER

CROSS-REFERENCE TO RELATED APPLICATIONS

This application claims the benefit of U.S. Provisional Application Nos. 61/681,945, filed on Aug. 10, 2012, the entire disclosure of which is incorporated herein by reference.

TECHNICAL FIELD

The present disclosure relates generally to lighting using solid state light sources such as light-emitting diodes or lasers and, more specifically, to heat dissipation devices for use in such light sources.

BACKGROUND

This section provides background information related to the present disclosure which is not necessarily prior art.

Providing alternative light sources is an important goal to reduce energy consumption. Alternatives to incandescent bulbs include compact fluorescent bulbs and light-emitting diode (LED) light bulbs. The compact fluorescent light bulbs use significantly less power for illumination. However, the materials used in compact fluorescent bulbs are not environmentally friendly.

Various configurations are known for light-emitting diode lights. Light-emitting diode lights last longer and have less environmental impact than compact fluorescent bulbs. Light-emitting diode lights use less power than compact fluorescent bulbs. They are also relatively expensive. In order to achieve maximum life from a light-emitting diode, heat must be removed from around the light-emitting diode. In many known configurations, light-emitting diode lights are subject to premature failure due to heat and light output causing increased temperatures at the light-emitting diode.

SUMMARY

This section provides a general summary of the disclosure, and is not a comprehensive disclosure of its full scope or all of its features.

The present disclosure provides a light assembly that includes a light source circuit board, a plurality of light sources disposed on the light source circuit board, a housing thermally coupled to the light source circuit board and a lens cap assembly thermally coupled to the housing comprising a lens cap and a heat dissipation layer. The heat dissipation layer distributes heat from the light source circuit board through the lens cap and external to the light assembly.

In a further aspect of the disclosure, a method comprises molding a heat dissipation layer into a lens cap to form a lens cap assembly, coupling a light source circuit board to the lens cap to form a light assembly, generating heat at the light source circuit board and dissipating the heat from the light source circuit board through the heat dissipation layer in the lens cap assembly external to the light assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

Corresponding reference numerals indicate corresponding parts throughout the several views of the drawings.

DETAILED DESCRIPTION

The following description is merely exemplary in nature and is not intended to limit the present disclosure, application, or uses. For purposes of clarity, the same reference numbers will be used in the drawings to identify similar elements. As used herein, the phrase "at least one of A, B, and C" should be construed to mean a logical (A or B or C), using a non-exclusive logical OR. It should be understood that steps within a method may be executed in different order without altering the principles of the present disclosure.

It should be noted that in the following figures various components may be used interchangeably. For example, several different examples of control circuit boards and light source circuit boards are implemented. Various combinations of heat sinks, control circuit boards, light source circuit boards, and shapes of the light assemblies may be used. Various types of printed, stamped, oxide-coated, anodized or laser cut electrically conductive layers and materials may also be used interchangeably in the various examples of the light assembly.

In the following figures, a lighting assembly is illustrated having various examples that include solid state light sources such as light-emitting diodes (LEDs) and solid state lasers with various wavelengths. LEDs may be conventional or side emission LEDs. Different numbers of light sources and different numbers of wavelengths may be used to form a desired light output depending upon the ultimate use for the light assembly. The light assembly provides an opto-thermal solution for a light device and uses multiple geometries to achieve the purpose.

Figure 1A:
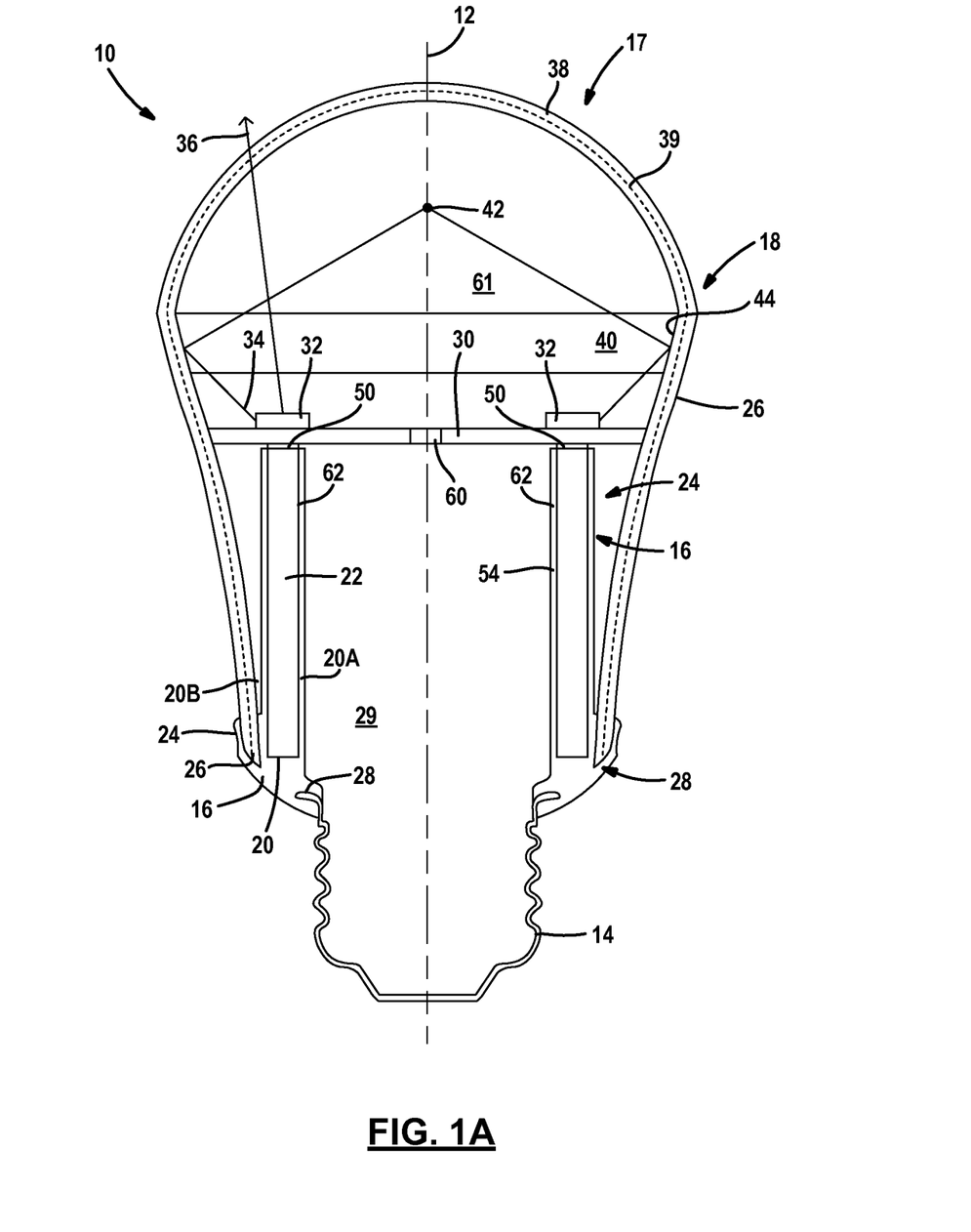
FIG. 1A is a cross-sectional view of a first example of a light assembly according to the present disclosure.

Referring now to FIG. 1A, a cross-section of a light assembly 10 is illustrated. Light assembly 10 may be rotationally symmetric around a longitudinal axis 12. The light assembly 10 includes a lamp base 14, a housing 16, and a cover or lens cap assembly 17 having lens cap 18. The lamp base or base 14 is used for providing electricity to the bulb. The base 14 may have various shapes depending upon the application. The shapes may include a standard Edison base, or various other types of larger or smaller bases. The base 14 may be various types including screw-in, clip-in or plug-in. The base 14 may be at least partially made from metal for making electrical contact and may also be used for thermal heat conduction and dissipation. The base 14 may also be made from material not limited to ceramic, thermally conductive plastic, plastic with molded circuit connectors, or the like. The base 14 may also contain other control circuits, such as a drive circuit board.

The housing 16 is adjacent to the base 14. The housing 16 may be directly adjacent to the base 14 or have an intermediate portion therebetween. The housing 16 may be formed of a heat-conductive material such as metal, a thermally conductive plastic, plastic or combinations thereof. The housing 16 may be formed in various ways including stamping, extrusion, plastic molding such as over-molding, injection molding, blow molding or combinations thereof.

The housing 16 has a first retainer ring 20 formed therein. The first retainer ring 20 is a recessed channel within the housing 16. The first retainer ring 20 is defined by a first wall 20A and a second wall 20B. The retainer ring 20 receives a thermally conductive sleeve 22. The thermally conductive sleeve 22 may be cylindrical in shape. The walls 20A and 20B may extend the length of the thermally conductive sleeve 22 adjacent to the thermally conductive sleeve. Also, the walls 20A, 20B may be less than the length of the thermally conductive sleeve 22. The walls 20A, 20B may also be different lengths and thickness. The thickness of the walls of the thermally conductive sleeve 22 changes the efficiency of the heat transfer.

The housing 16 has a wall 24 that defines a second retaining ring 26 with the wall 20A in the housing 16. The second retaining ring 26 is used to retain the lens cap assembly 17 therein. A thermally conductive adhesive in the ring 26 may be used to maintain the position of the lens cap assembly 17 within the housing 16. Metal infused polymers may be used as the adhesive. The retainer rings 20, 26 may be integrally formed into the housing 16.

The housing 16 may also include a channel 28 for receiving the lamp base 14 therein. The lamp base 14 may be secured to the housing 16 by way of over-molding or other fastening means.

The housing 16 may define a first volume within the light assembly 10. As will be described below, the first volume 29 may be used to accommodate a control circuit board or other circuitry for controlling the light-emitting diodes or other light sources therein as will be described later.

In another example, the housing 16 can be integrated to the lens cap assembly 17 and made from the same material. The housing 16 can be made of light transmitting material, light shifting material and/or a heat transferring layer. The housing 16 may have various outer shapes including a hyperboloidal shape. The housing 16 may also be a free-form shape.

The housing 16 and lens cap assembly form an enclosure around a substrate or circuit board 30 having light sources 32 disposed thereon. The base 14 may also be included as part of the enclosure.

The light assembly 10 includes the substrate or circuit board 30 used for supporting solid state light sources 32. The circuit board 30 may be thermally conductive and may also be made from heat sink material. Solder pads of the light sources may be thermally and/or electrically coupled to radially-oriented copper sectors or circular conductive elements overmolded onto a plastic base to assist in heat conduction. In any of the examples below, the circuit board 30 is part of the heat sinking path.

The light sources 32 have a high lumen-per-watt output. The light sources 32 may generate the same wavelength of light or may generate different wavelengths of light. The light sources 32 may also be solid state lasers. The solid state lasers may generate collimated light. The light sources 32 may also be light-emitted diodes such as conventional or side emitting diodes. A combination of different light sources generating different wavelengths may be used for obtaining a desired spectrum. Examples of suitable wavelengths include ultraviolet or blue (e.g. 450-470 nm) and combinations thereof. Multiple light sources 32 generating the same wavelengths may also be used. The light sources 32 such as light-emitting diodes generate low-angle light 34 and high-angle light 36. High-angle light 36 is directed out through the lens cap 18. A side emitting diode may generate only low angle light.

The lens cap 18 may be a partial spheroid, partial ellipsoid or combinations thereof in shape. In this example both an upper portion 38 is a spheroidal portion and a partial rotated ellipsoidal portion is referred to as a reflector 40. That is, the different lens cap portions 38, 40 may be monolithic or integrally formed. The lens cap 18 may be formed of a transparent or translucent material such as glass or plastic. In one example, the lens cap 18 is formed of polyethylene terephthalate (PET). PET has a crystalline structure that allows heat to be transferred therethrough. Heat may be transferred form the housing 16 into the lens cap 18 because of the direct contact therebetween. Thermally conductive adhesive may also be used to increase the thermal transfer. The thermal adhesive is disposed in the ring 26. Thermally conductive adhesive may also be used in the ring 20 for securing the sleeve 22 to the housing 16.

The lens cap assembly 17 may also include a heat dissipation layer 39. The heat dissipation layer 39 may be a discontinuous layer with spaces or voids with no heat dissipation layer material therein. The layer 39 may be a mesh material that is molded or formed therein. Heat from the light sources that travels through the housing is dissipated outside the light assembly to the ambient area around the light assembly with the heat dissipation layer. The mesh material may be a screen molded into the material of the lens cap 18. The mesh may be aluminum. Molding may be blow or injection molding. The molding process will be described in further detail below. Although shown within the lens cap 18, the heat dissipation layer 39 may be on the outside, inside or within the lens cap 18.

The heat dissipation layer 39 may also be a coating on the inside or outside of the lens cap 18. A coating may be a printed coating or a nanoparticle coating. Nanoparticles may also be impregnated into the lens cap 18 to form the heat dissipation layer.

The heat dissipation layer 39 is thermally conductive to distribute and dissipate heat over the surface of the lens cap 18. The heat dissipation layer 39 allows visible light to be transmitted therethrough. The heat dissipation layer 39 may reflect light directly incident thereon. The reflected light may be energy converted (wavelength shifted as described below).

Eventually the shifted light will reflect from the components within the light assembly such as the circuit board and leave the light assembly.

The upper portion 38 of the lens cap 18 may diffuse light and minimize backscattered light trapped within the light assembly 10. The upper portion 38 may be coated with various materials to change the light characteristics such as wavelength (energy) or diffusion of the light emitted from the light sources. An anti-reflective coating may also be applied to the inside of the spheroidal portion 38 of the lens cap 18. A self-radiating material may also be used which is pumped by the light sources 32. Thus, the light assembly 10 may be formed to have a high color rendering index and color perception in the dark. The heat dissipation layer 39 may also be coated with or include various materials to change the light characteristics. For example, the heat dissipation layer 39 may include a photo-luminescent material for performing energy conversion as an energy conversion material. The energy conversion material may convert the energy from the light sources from one wavelength to another wavelength. As mentioned above, the photo-luminescent material may also be coated on the inside of the lens cap 18. The layer 39 may be referred to as a thermo-chromic material because of the ability to change color of the light reflected therefrom due to temperature.

Often times in a typical light bulb, the low-angle light is light not directed in a working direction. Low angle light is usually wasted since it is not directed out of the fixture into which the light assembly is coupled.

The low-angle light 34 is redirected out of the lens cap 18 using the reflector 40. The reflector 40 may be various shapes including a paraboloid, ellipsoid, or free-formed shape. The reflector 40 may also be shaped to direct the light from the light sources 32 to a central or common point 42. The reflector 40 may have a coating for wavelength or energy shifting and spectral selection. Coating one or both of the lens cap 18 and the reflector 40 may be performed. Multiple coatings may also be used. The common point 42 may be the center of a spheroid portion of the lens cap 18.

The reflector 40 may have a reflective coating 44 used to increase the reflectivity of the reflector. However, certain materials upon forming may not require the reflective coating 44. For example, some plastics, when blow-molded, provide a shiny or reflective surface such as PET. The reflector 40 may be formed of the naturally formed reflective surface generated when blow-molding plastic.

It should be noted that when referring to various conic sections such as an ellipsoid, paraboloid or hyperboloid only a portion of the conic section that is rotated around an axis may be used for a particular surface. In a similar manner, portions of a spheroid may be used.

The circuit board 30 may be in direct contact (or indirect contact through an interface layer 50) with the thermally conductive sleeve 22. The heat transfer path from the light sources 32 may be through the interface layer 50 or directed to the thermally conductive sleeve 22. The thermally conductive sleeve 22 conducts heat toward the housing 16. The housing 16, being also thermally conductive, conducts heat to the lens cap assembly 17 which dissipates heat through the screen or mesh 39. Heat is transferred upward toward the end of the light assembly 10 opposite the base 14. As mentioned above, thermally conductive adhesive may be used to enhance the thermal transfer between the housing 16 and the lens cap assembly 17 and the thermally conductive sleeve 22 and the housing 16.

Figure 1B:
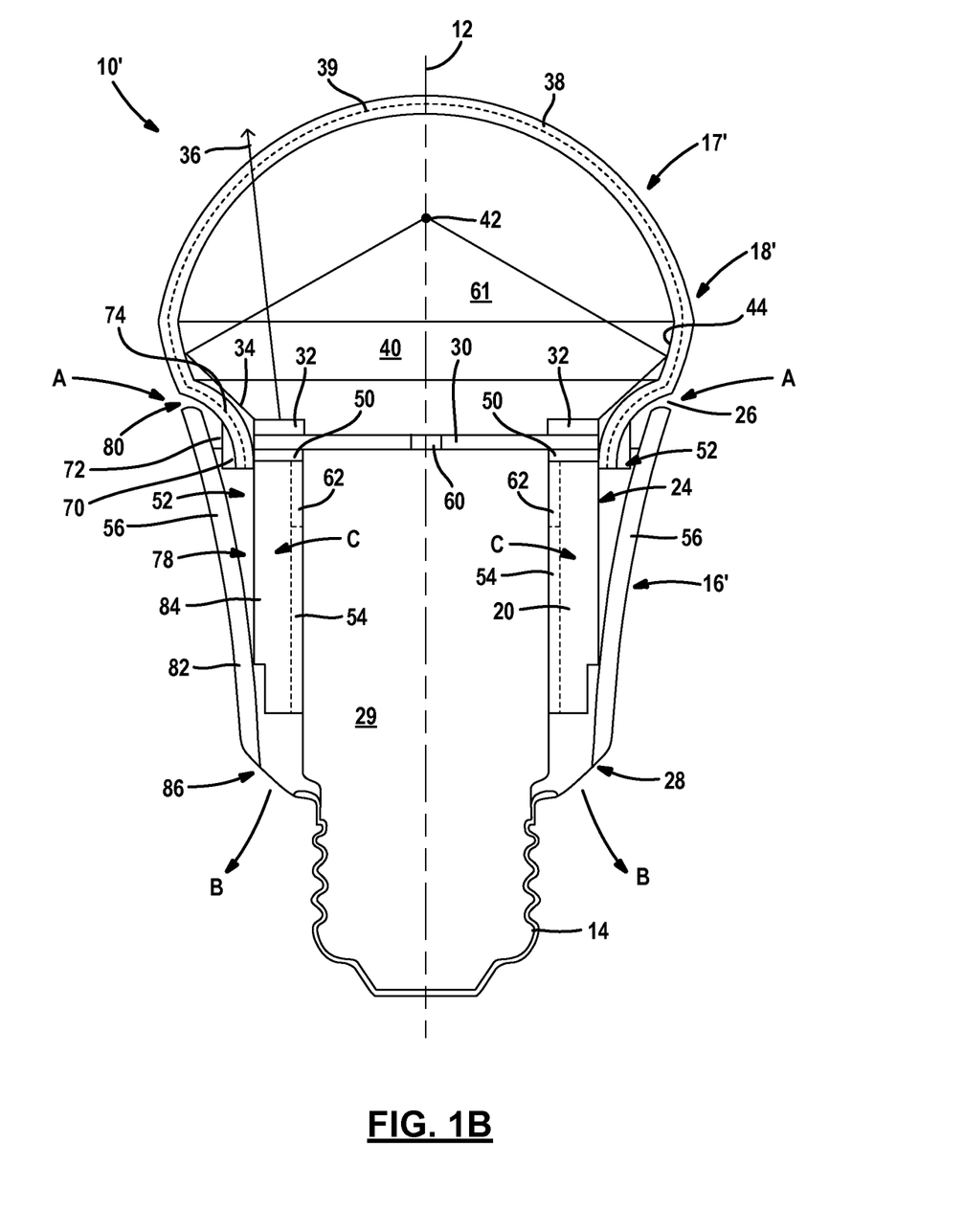
FIG. 1B is an alternative example of the present disclosure.

Referring now to FIG. 1B, a second example of a light assembly 10' is set forth. In this example, the same components from those set forth in FIG. 1A are labeled with the same reference numerals.

In this example, the housing 16' may include a plurality of fins 52 that extend longitudinally and radially outwardly to form channels 78. The fins 52 may be spaced apart to allow heat to be dissipated therefrom. As will be described further below, the channels 78 may be formed between an inner wall 54, an outer wall 56 and the fins 52 that may be formed of a combination of both the first portion 84 and the second portion 82 of the housing 16'.

In FIG. 1B, the housing 16 has a retainer ring 70. The retainer ring 70 may be coupled to the plurality of fins 52 or the walls 54 or 56, for example. The retainer ring 70 is used to couple the lens cap assembly 17' to the housing 16. The retainer ring 70 may have threads 72 that mate with or engage threads 74 on the lens cap 18. The lens cap assembly 17', is adjacent to the circuit board 30 and the thermally conductive sleeve 22. Of course, as in FIG. 1A, thermally conductive adhesive may replace the threads. Heat from the circuit board 30 may conduct toward the retainer ring 70 where it is conducted into the fins 52 and dissipated in the channels 78. Heat is also transferred into the lens cap assembly 17' from the circuit board and thermally conductive sleeve 22, where it is conducted through the mesh 39.

Other positive positions of the lens cap assembly 17' include adjustment to the circuit board 30, so the lens cap assembly 17' holds the circuit board 30 in place.

The circuit board 30 may also include an optional port 60 for communicating air between the first volume 29 and a second volume 61 within the lens cap 18. Heated air that is in the lens cap 18' may be transmitted or communicated into the first volume 29 and through an opening 62 within the first portion 20 of the housing 16' to vent air into the channels 78. The opening 62 will be further described below. The heated air within the lens cap 18 may conduct through the lens cap 18 and circuit board 30 to the housing as well as being communicated through the port 60.

The housing 16' may thus conduct heat away from the light sources 32 of the circuit board for dissipation to the ambient air outside the light assembly. The heat may be dissipated in the housing and the fins 52. Heat may also be transferred into the lens cap assembly 17' directly from the housing 16' using conduction. In this manner heat may be transferred longitudinally by the housing 16' in two directly opposite directions.

The channel 78 may have a first cross-sectional area located adjacent to the lens cap 18 that is wider than the cross-sectional area approximate the lamp base 14. The channels 78 provide convective cooling of the housing 16' and the light assembly 10. The tapered cross-sectional area provides a nozzle effect which speeds the velocity of air through the channel 78 as the channel 78 narrows. An inlet 80 to the channel 78 is provided between an outer portion 82 and an inner portion 84. An outlet 86 is travelling at a higher speed than the air entering the inlet 80. Arrows A indicate that the direction of the air input through the inlet 80 through the channels and arrow B provides the outflow direction of air from the channels 78.

Figure 2A:
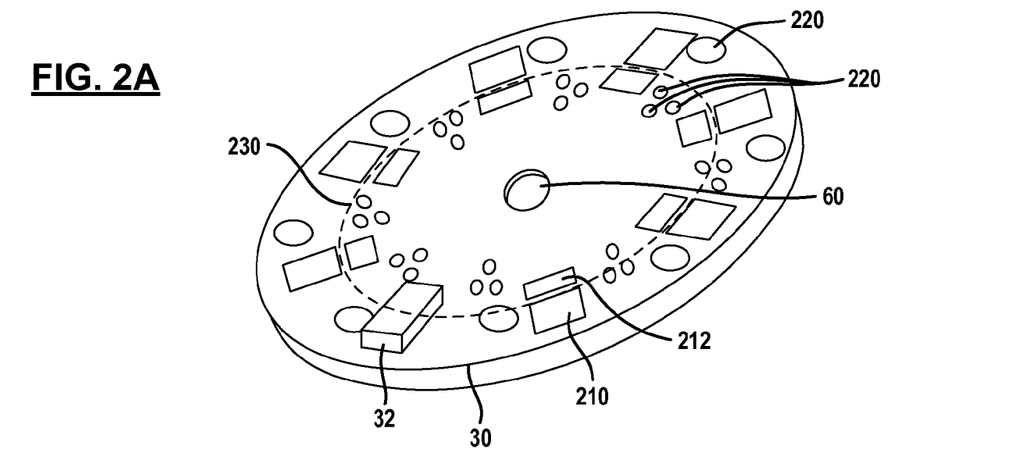
FIGS. 2A and 2B are perspective views of a circuit board formed according to the present disclosure.

Referring now to FIG. 2A, an example of a circuit board 30 is illustrated. The circuit board 30 includes the plurality of light sources 32 thereon. Only one light source 32 is illustrated for simplification. As mentioned above, the light source may be an LED, side emitting LED, laser or other light source. The circuit board 30 includes a plurality of solder pads 210 for mounting the light source 32. Cathode solder pads 210 are illustrated as well as an anode solder pad 212. The cathode solder pads 210 and the anode solder pads 212 are located adjacent to each other in a radial position in this example. Thus, when the elongated light source 32 is disposed on the solder pads 210, 212, the light sources 32 are radially disposed. That is, the longitudinal axis of the light source 32 aligns radially with the circuit board 30. The cathode solder pads 210 may be connected in various manners depending upon the type of construction used for the circuit board 30. The interconnections of the cathode solder pad 210 are not illustrated. The cathode solder pads may remain exposed (not coated or covered) to increase thermal conduction. Likewise, the inner connections of the anode solder pads 212 also depend upon the type of construction used and thus are not illustrated.

The circuit board 30 may also include a plurality of thermal vias 220 thereon. The thermal vias 220 allow the heat from the upper layers caused from the light sources 32 to conduct heat to the bottom of the circuit board 30 and ultimately into the housing 16. The light sources 32 are disposed in a ring 230. The interaction of the ring and the reflector 40 are described further in FIG. 3. The surface of the circuit board 30 may be coated with reflective material (or be made of reflective material) or be coated with light shifting material. The thickness of the walls of the thermally conductive sleeve 22 defies the efficiency of the heat transfer.

Figure 2B:
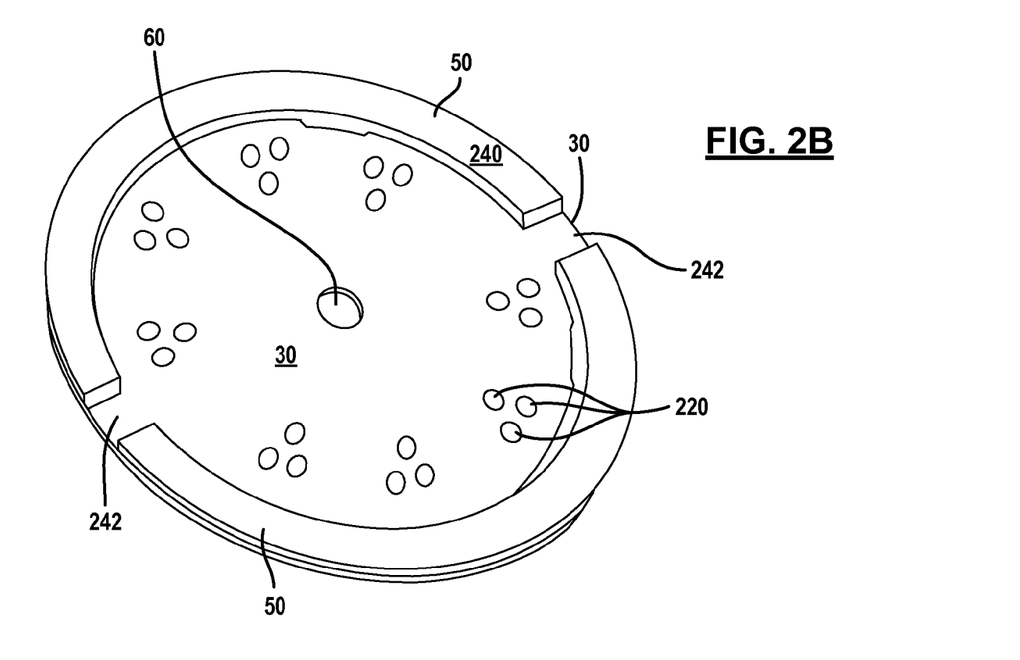

Referring now to FIG. 2B, a simplified view of the circuit board 30 is illustrated. The circuit board 30 includes the thermally-conductive interface 50 that is used for enhancing heat transfer between the circuit board 30 and the housing 16 of FIG. 1A. The thermally-conductive interface 50 may be shaped to conform to the shape of the surface of the housing 16 to which heat transfer takes place.

Openings 242 may be left in the thermally-conductive material 240 to increase flow through the opening 62 of the housing 16' of FIG. 1B. Because this is an open portion, no thermal conduction takes place directly between the circuit board 30 and the housing 16' in this region. However, the thermally-conductive portion 240 may extend completely around the circuit board 30.

Figure 3A:
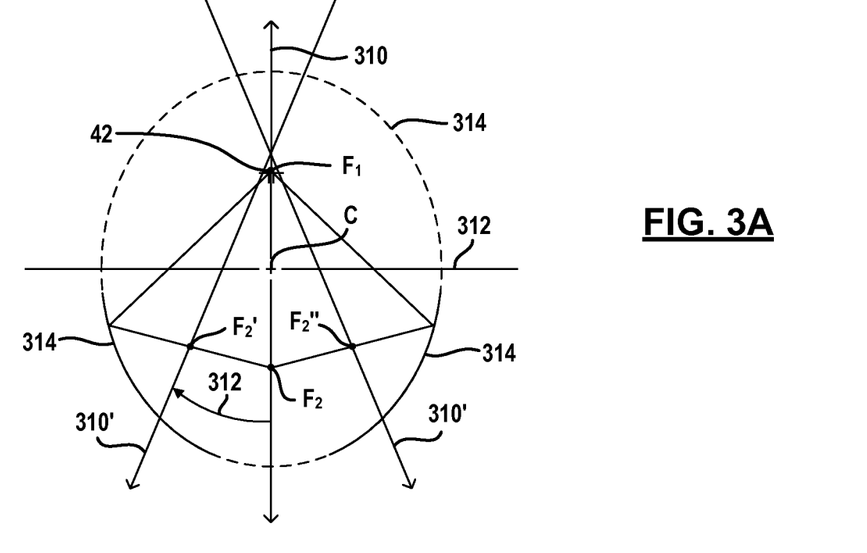
FIGS. 3A and 3B illustrate a construction of the rotated partial ellipsoid forming the reflector 40.

Referring now to FIG. 3A, a method for forming the reflector 40 is set forth. The reflector 40 is a shifted or offset ellipsoid as described above. The ellipsoid has two focal points: F1 and F2. The ellipsoid also has a center point C. The major axis 310 of the ellipse 308 is the line that includes F1 and F2. The minor axis 312 is perpendicular to the major axis 310 and intersects the major axis 310 at point C. To form the shifted ellipsoid, the focal points corresponding to the light sources 32 are moved outward from the major axis 310 and are shifted or rotated about the focal point F1. The ellipsoid is then rotated and a portion of the surface of the ellipsoid is used as a reflective surface. The angle may be various angles corresponding to the desired overall geometry of the device. In an ellipse, light generated at point F2 will reflect from a reflector at the outer surface 314 of the ellipse and intersect at point F1. The reflector shape may also correspond to a stand-alone reflector shape such as that illustrated in FIG. 10 as 1010.

Figure 3B:
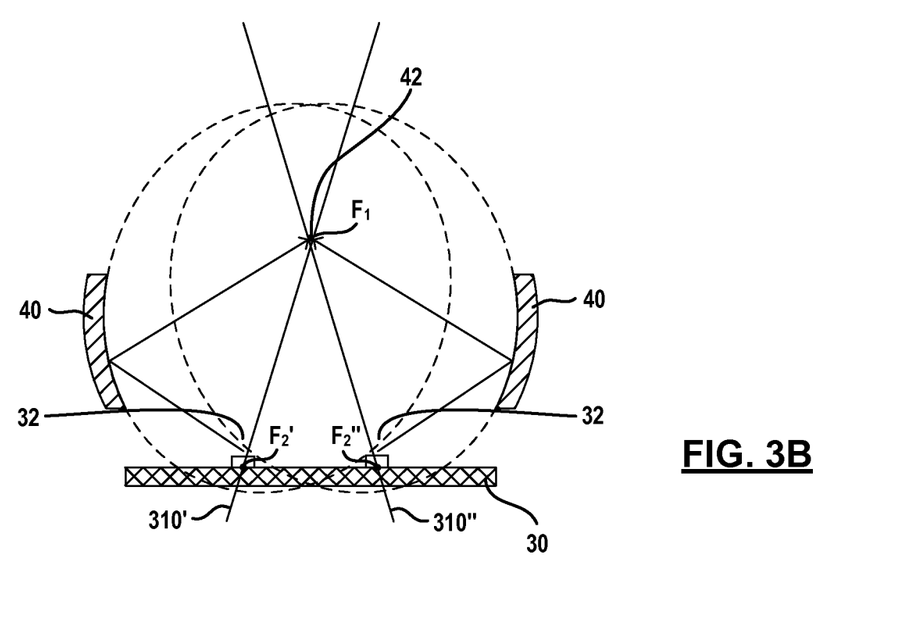

Referring now to FIG. 3B, the shifted or offset ellipsoid will reflect light from the focal points F2' and F2" to intersect on the focal point F1. The focal points F2' and F2" are on a ring of light sources 32 whose low-angle light is reflected from the shifted ellipsoid surface and the light is directed to focal point F1. The construction of the ellipsoid can thus be seen in FIG. 3B since the focal point F2 now becomes the ring that includes F2' and F2".

The reflector 40 can thus be described as a section having an ellipsoidal cross-section comprising a partial continuous rotated elliptical reflector having a first focal point within the lens cap 18 and a plurality of second focal points disposed in a continuous second ring coincident with a first ring intersecting the plurality of light sources. The first focal point may be coincident with a center point 42 of the lens cap 18. The partial continuous rotated ellipsoidal reflector reflects low angle light from the plurality of light sources toward the first focal point then through the lens cap. The reflector 40 is formed by rotating a major axis of an ellipse around the second ring while continually intersecting the first focal point.

Figure 4A:
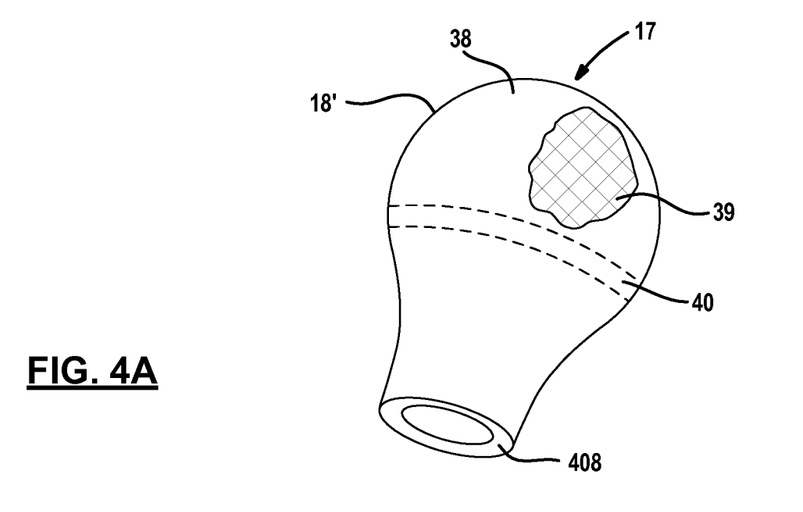
FIG. 4A is a perspective view of the lens cap or cover of FIG. 1A.

Referring now to FIG. 4A, the lens cap assembly 17 is illustrated in further detail. The lens cap assembly 17 has an upper portion of which a small piece of the mesh 39 is illustrated. The mesh 39 may extend across all or substantially all of the lens cap 18 or upper portion 38. The lens cap 18 may also include the reflector portion 40 illustrated in dotted lines that is enclosed therein. A bottom surface 408 may be placed directly within the retainer ring 26 of the housing 16 as illustrated in FIG. 1A.

Figure 4B:
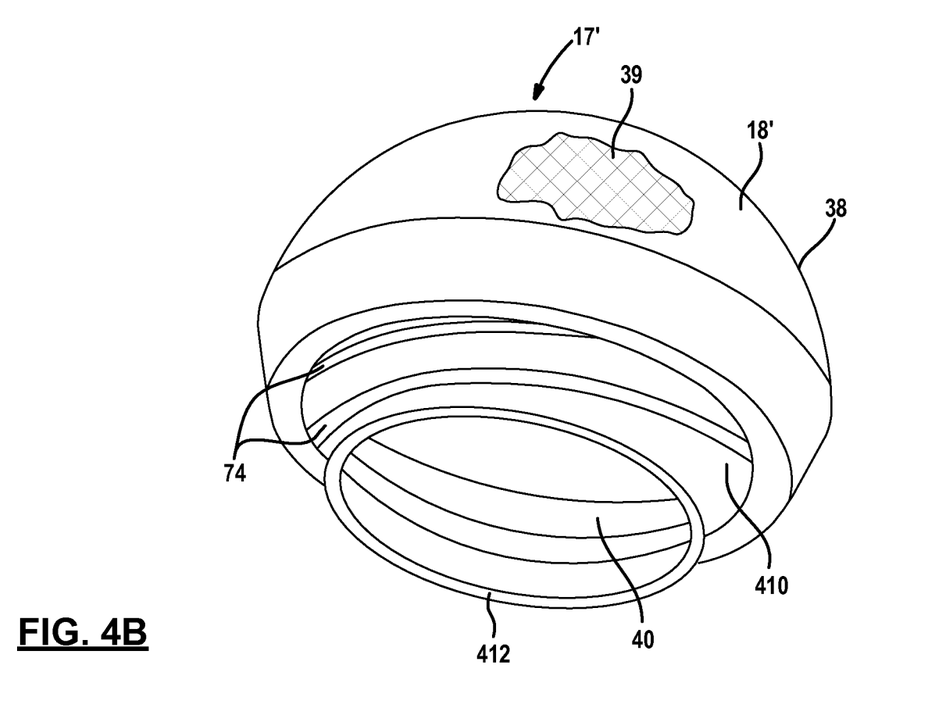
FIG. 4B is a perspective view of the cover or lens cap 18' of FIG. 1B.

Referring now to FIG. 4B, the lens cap 18' of FIG. 1B is illustrated in further detail. The lens cap 18' has the upper portion 38 and the reflector portion 40 formed therein. The lens cap assembly 18 may also include a flange 410 that extends from the reflector portion 40. The flange 410 has a bottom surface or edge 412. The outer surface of the flange 410 may contact the circuit board 30 and the sleeve 22. This is illustrated in FIG. 1B. In one example, the flange 410 is fixed into the retainer ring 70 by the threads 74.

A portion of heat dissipation layer 39 is illustrated within the lens cap 18. The heat dissipation layer 39 may completely fill or nearly completely fill as coextensive the entire lens cap 18'.

Figure 5:
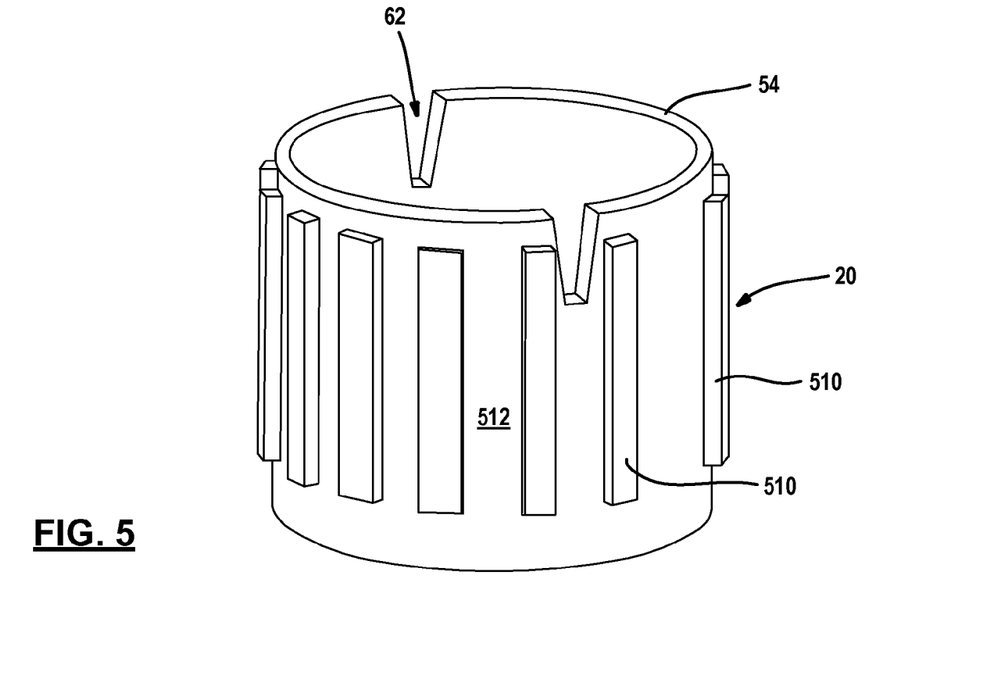
FIG. 5 is a perspective view of a first portion of the housing.

Referring now to FIG. 5, the first portion 84 of the housing 16' of FIG. 1B is illustrated in further detail. The first portion 84 may be cylindrical in shape. The cylindrical shape allows easy manufacturing by extrusion or another type of process. The first portion 84 in one constructed example is composed of aluminum which is both a thermally-conductive material and an electrically-conductive material. The tubular structure of the first portion 84 includes the inner wall 54 which defines the first volume 29 illustrated in FIG. 1. The tubular wall may have openings 62 therein for venting the heat within the volume 29 to the channels as described above.

The inner wall 54 may have first fin portions 510 extending therefrom. The fin portions 510 are used to form the channels 78 described above. The first fin portions 510 may not extend the length in a longitudinal direction of the inner wall 54. The spaces between the fin portions 510 illustrated by reference numeral 512 eventually become a portion of the channels.

Figure 6:
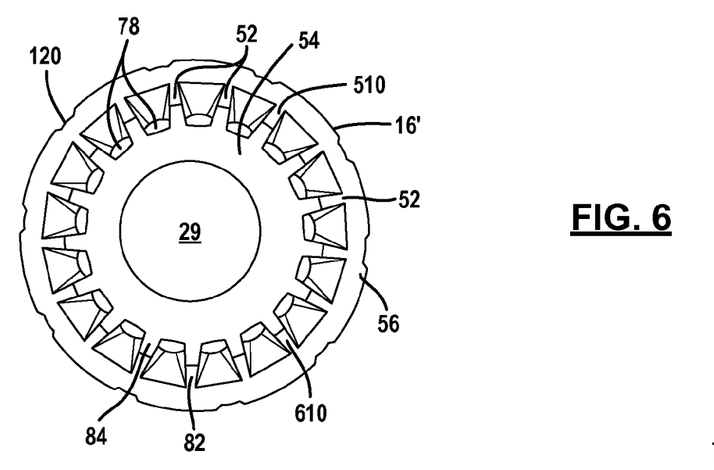
FIG. 6 is an end view of the first portion of housing closest to the lens cap.

Referring now to FIG. 6, a top view of the housing 16' of FIG. 1B is illustrated in further detail. The housing encloses the first volume 29. The housing 16' may have a first portion 84 and a second portion 82. As mentioned above, the first portion 84 may be formed of various materials including extruded aluminum. The first portion 84 may also contain first fin portions 510 that are partially used to define the fins 52. The fins 52 may also have a second portion 610 extending from the outer wall 56 of the housing 16'. The second fin portions 610 extend radially inwardly and have an end or edge that directly abuts or is formed adjacent to an edge of the first portion 510 of the fins 52. A plurality of channels 78 is illustrated defined between the first portions 510, the second portion 610 of the fins 52 and the inner wall 54 and the outer wall 56 of the housing 16'. As can be seen, the upper portion or the portion adjacent to the lens cap 18' has a larger cross-sectional area than the lower portion of the channel that is adjacent to the lamp base 14 illustrated in FIG. 1. In this example, the outer wall forms a tapered surface that reduces the cross-sectional area of the channel 78. In the multiple channels i, the relationship of the density of the air (ρ), velocity of the air (v) and area of the channel (a) in to out is determined by the formula:

$$\Sigma(\rho v a)\_in\textasciicircum i = \Sigma(\rho v a)\_out\textasciicircum i$$

Thus, as the air becomes less dense (heated) the velocity in the channel 78 increases. The air at the narrower outlet is faster than the air at the inlet causing the channel to have a nozzle effect.

The outer wall 56 may also contain channels 620 to increase the affectivity of the heat-sinking capability of the housing 16'. As well as improving grip when changing the light assembly.

Figure 7:
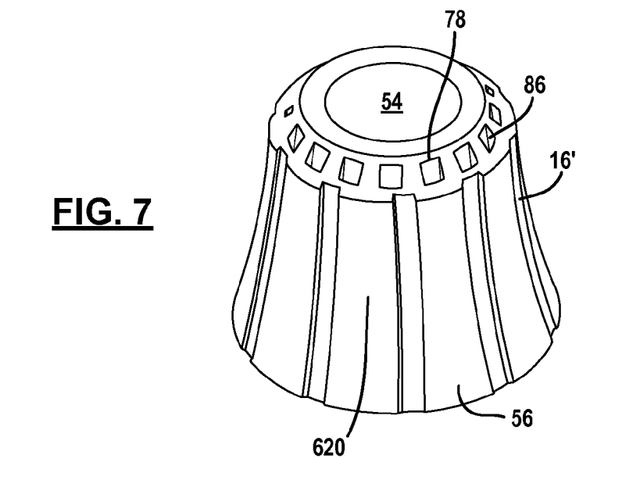
FIG. 7 is a perspective view of the housing.

Referring now to FIG. 7, an external view of the housing 16' of FIG. 1B is illustrated. In this view, the outlet ports 86 of the channels 78 are clearly shown at the portion of the housing 16 closest to the lamp base, when assembled. The air within the channels 78 is heated as it travels through the channels and is emitted from the exit or outlet 86.

Figure 8:
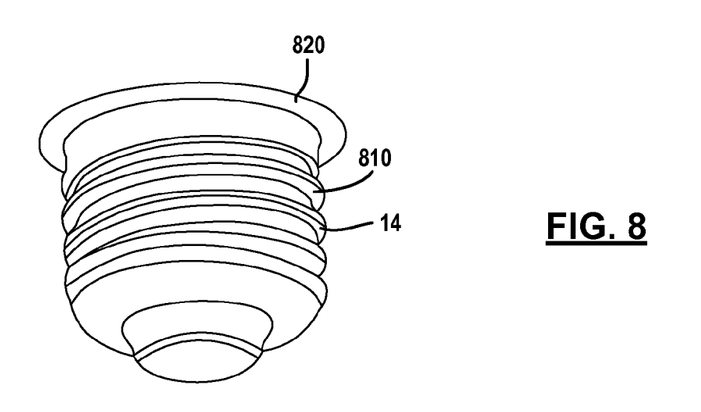
FIG. 8 is a perspective view of the lamp base.

Referring now to FIG. 8, the lamp base 14 suitable for use in the example both FIGS. 1A and 1B is illustrated in further detail. The lamp base 14 in this example includes threads 810. The lamp base 14 illustrated is referred to as an Edison base. However, other types of bases may be included within the device.

The lamp base 14 also includes a flange 820. The flange 820 may be used to secure the lamp base 14 to the housing 16 (or 16') illustrated above. In this manner, the lamp base 14 will be affixed to the housing 16. Of course, other types of affixing may be performed including adhesives or fasteners.

Figure 9:
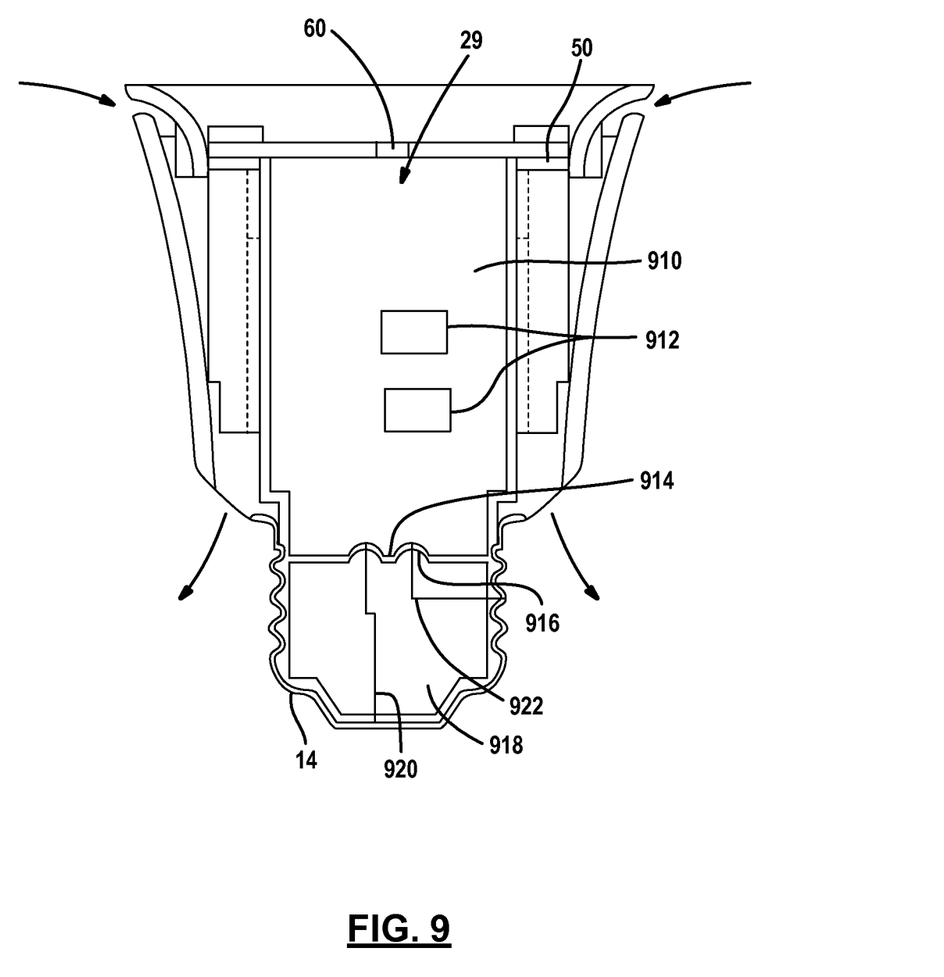
FIG. 9 is a cross-sectional view of the lower portion of the light assembly having a control circuit board therein.

Referring now to FIG. 9, a control circuit board 910 may also be included within the volume 29 of light assembly 10 or 10'. Although FIG. 9 is illustrated with the light assembly 10' of FIG. 1B the circuit board 910 may be configured into the light assembly 10 of FIG. 1A. The control circuit board 910 is illustrated as planar. Different examples of the circuit board 910 may be implemented, such as a cylindrical or longitudinally-oriented circuit board. The circuit board 910 may be various shapes.

The control circuit board 910 may include various control chips 912 that may be used for controlling various functions of the light sources 32. The control chips 912 may include an alternating current (AC) to direct current (DC) converter, a dimming circuit, a remote control circuit, discrete components such as resistors and capacitors, and a power circuit. The various functions may be included on an application-specific integrated circuit. Although only one control circuit board 910 is illustrated, multiple circuit boards may be provided within the light assembly 10, 10'.

The circuit board 910 may have a connector 914. The connector 914 may couple a connector 916 of an AC input board 918. The AC input board 918 may be located in the lamp base circuit traces 920, 922 may provide AC voltage to the connector 916 which, in turn, provides AC voltage to the connector 914 and to the circuit board 910.

Figure 10:
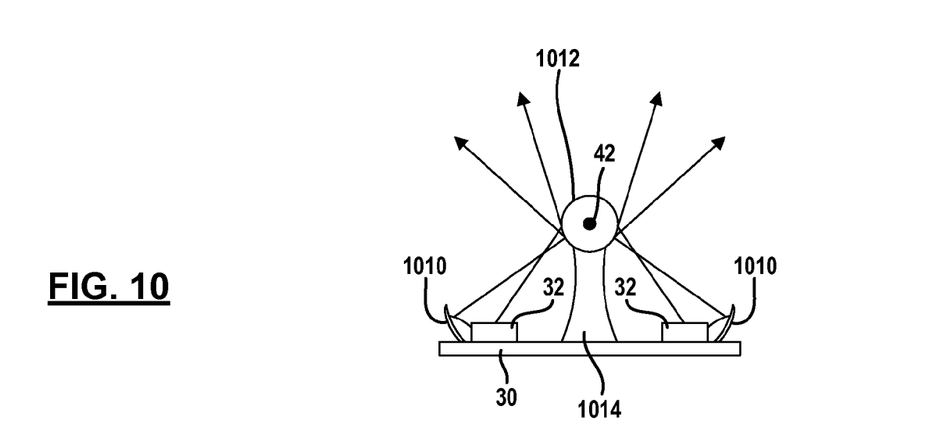
FIG. 10 is a partial view of light redirecting elements suitable for use in the examples of FIGS. 1A and 1B.

Referring now to FIG. 10, circuit board 30 or alternatives for circuit board 30 are illustrated. In this example, light redirecting elements 1010 are illustrated as mirrors. These mirrors may be elliptical or parabolic in shape. The light redirecting elements 1010 may direct light toward the center point 42. The shape of the light redirecting elements may be formed according to the teachings of FIGS. 3A and 3B.

In addition to, or alternatively, another light redirecting element 1012 may be positioned within the light assembly using a standoff 1014. In this example, the light redirecting element 1012 is a spherical member. Light directly emitted from the light sources 32 may be at least partially directed toward the center point 42 and thus to the light redirecting element 1012. Some or all of the light redirecting elements 1010, 1012 may be coded with a photo-luminescent material or energy shifting material. That is, the light emitted from the light source 32 may be converted to another wavelength with a film or coating on the light redirecting elements 1010, 1012. As mentioned above, the mesh 39 within the lens cap assembly 17 also may perform light shifting.

Figure 11:
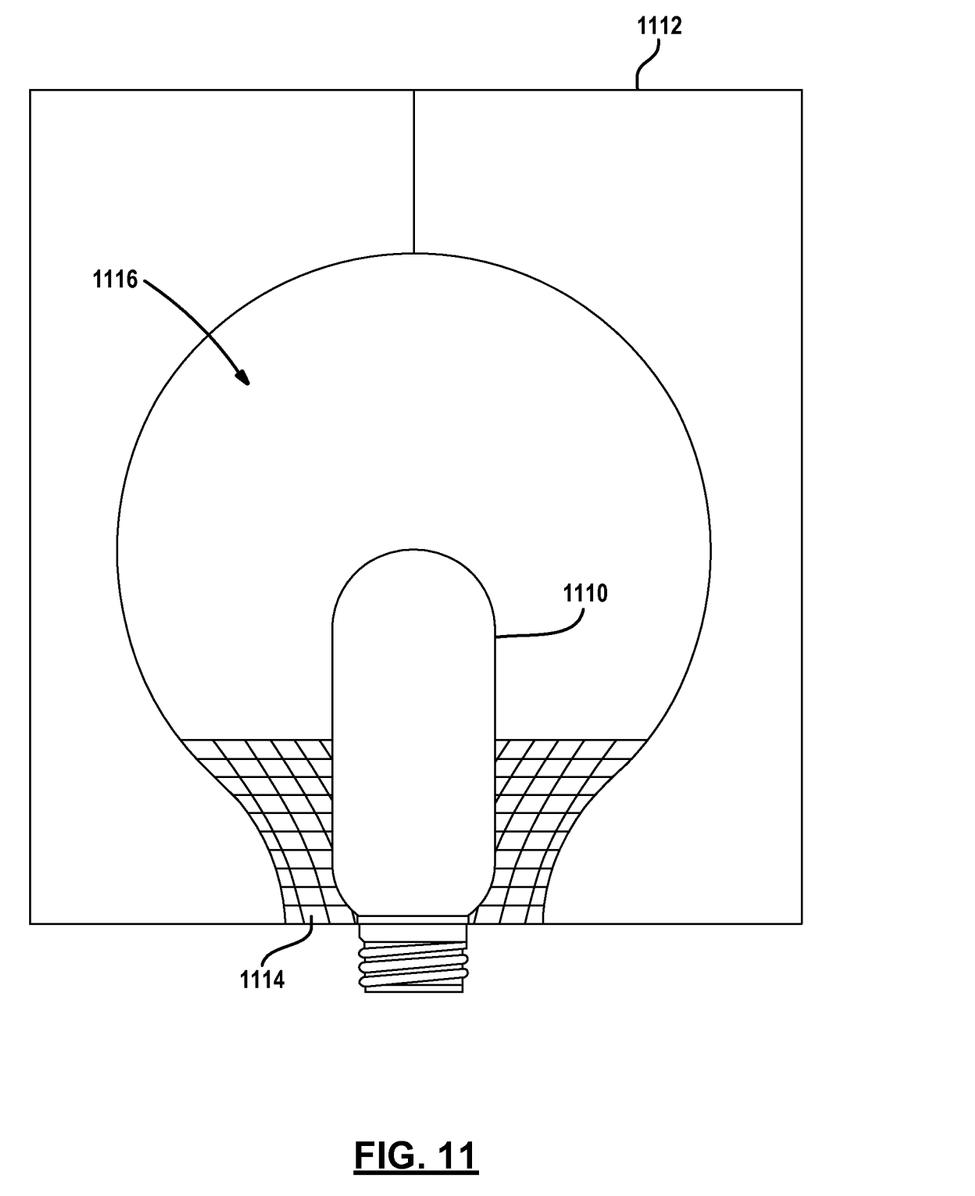
FIG. 11 is a cross-sectional view of a blow molding mold with a preformed mesh and lens cap preform.

Referring now to FIG. 11, a method for making a light assembly is set forth. In this example, a lens cap preform 1110 may be inserted into a mold cavity 1116 of the mold 1112. A screen or mesh preform 1114 used as a heat dissipation layer may also be inserted into the mold cavity 1116 either within or outside of the preform. As illustrated, the mesh preform is outside the lens cover preform and is disposed between the lens cap preform 1110 and the mold 1112. The mold 1112 is heated and the preform 1110 is also heated and blown to expand into the mold cavity 1116. The mesh 1114 also expands and is blown into place and integrally forms with the preform 1110. The amount of heat and the length of time of the blow molding depends upon the materials used for the preform 1110 and the mesh preform 1114. The mesh preform 1114 expands as the lens cap preform 1114 expands. If the preform forms a lens cap assembly 17' for use in FIG. 1B, threads may also be pre-formed as part of the process. The example of FIG. 1A does not require the use of threads.

The mold cavity 1116 is shaped to the desired shape for the lens cap 18, 18'. Ultimately, the mesh 39 becomes inserted within the thickness of the resulting lens cap as illustrated in FIGS. 1A, 1B, 4A and 4B.

As mentioned above, the lens cap assembly 17' may also be formed in various ways including molding or the like. No matter how the lens cap assembly 17' is formed, the circuit boards may then be inserted inside. The circuit board may have a width that allows for insertion through the bottom opening of the lens cap.

Figure 12:
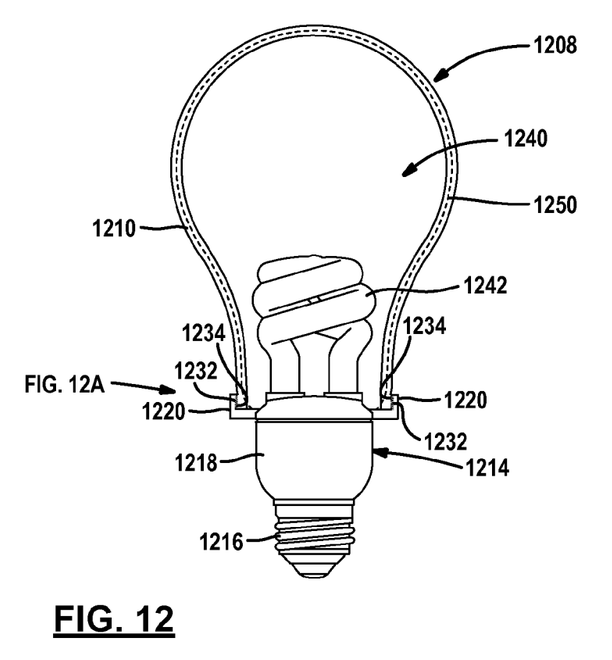
FIG. 12 is a cross-sectional view of a compact fluorescent light having a lens cap formed according to the present disclosure.
Figure 12A:
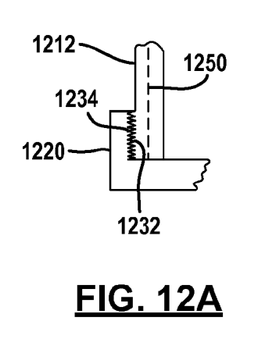
FIG. 12A is an enlarged cross-sectional view of a threaded portion of the compact fluorescent light of FIG. 12.

Referring now to FIG. 12, a lens cap assembly 1208 having a lens cap 1210 is set forth adjacent to a compact fluorescent bulb (CFL) 1214. The compact fluorescent bulb 1214 has a base 1216 and a housing 1218. A retainer 1220 extends around the housing 1218. The threads 1232 in the retainer 1220 and threads 1234 formed in the housing 1218 engage to seal the cavity 1240. By providing a sealing engagement of the threads 1232, 1234, any gas emissions from the element 1242 of the CFL bulb assembly 1214 is captured and prevented from following the environment. FIG. 12A shows an enlarged view of the threads 1232, 1234.

By providing the mesh 1212 within the lens cap 1210, the light emissions from the light element 1242 may be light shifted or changed.

Figure 13:
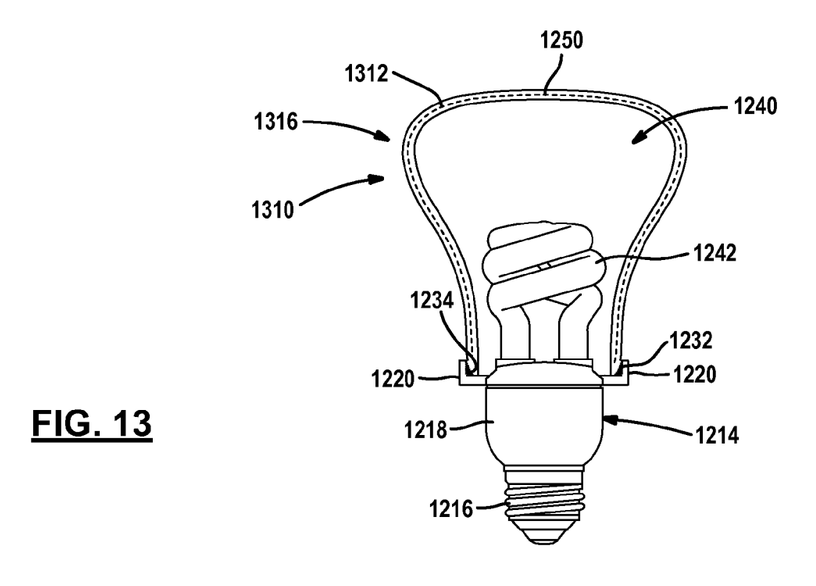
FIG. 13 is a cross-sectional view of a compact fluorescent spot bulb having a lens cap formed according to the present disclosure.

Referring now to FIG. 13, a spotlight 1310 is illustrated having a lens cap 1312. In this configuration the CFL is configured in a similar manner to that set forth in FIG. 12 with a different shaped lens cap.

It should be noted that the lens cap assemblies illustrated in FIGS. 12 and 13 may be formed by blow molding using a suitable shaped cavity using the apparatus of FIG. 11.

Both examples in FIGS. 12 and 13 may include a layer 1250 such as a heat dissipation layer. The layer 1250 may also act to generate light shifting with or without heat dissipation. In one example, the CFL element 1242 may generate UV light that is shifted to visible light by the layer 1250.

The foregoing description of the examples has been provided for purposes of illustration and description. It is not intended to be exhaustive or to limit the invention. Individual elements or features of a particular example are generally not limited to that particular example, but, where applicable, are interchangeable and can be used in a selected example, even if not specifically shown or described. The same may also be varied in many ways. Such variations are not to be regarded as a departure from the invention, and all such modifications are intended to be included within the scope of the invention.

What is claimed is:

1. A light assembly comprising:
   a light source circuit board;
   a plurality of light sources disposed on the light source circuit board;
   a housing thermally coupled to the light source circuit board; and
   a lens cap assembly thermally coupled to the housing comprising a lens cap and a mesh heat dissipation layer, said mesh heat dissipation layer is disposed within the lens cap between an outer surface and an inner surface of the lens cap and is disposed adjacent to the light source circuit board so that heat from the light source circuit board travels through the lens cap into the mesh heat dissipation layer where the heat is conducted through the mesh heat dissipation layer throughout the lens cap assembly where the heat dissipates through the lens cap external to the light assembly.

2. The light assembly as recited in claim 1 wherein the mesh heat dissipation layer is integrally formed within the lens cap.

3. The light assembly as recited in claim 1 wherein the housing comprises a thermally conductive sleeve conducting heat to the mesh heat dissipation layer.

4. The light assembly as recited in claim 1 wherein the housing comprises a retainer ring for retaining the lens cap to the housing.

5. The light assembly as recited in claim 4 wherein the retainer ring comprises first threads engaging second threads of the lens cap for retaining the lens cap to the housing.

6. The light assembly as recited in claim 1 further comprising disposing an energy conversion material on the mesh heat dissipation layer for converting first energy from the light sources into a second energy.

7. The light assembly as recited in claim 1 wherein the mesh heat dissipation layer is a thermo-chromic element.

8. The light assembly as recited in claim 1 wherein the light source circuit board is at least partially disposed in the lens cap and further comprising a control circuit board at least partially disposed in the lens cap.

9. The light assembly as recited in claim 8 wherein the control circuit board is thermally coupled to the mesh heat dissipation layer.

10. The light assembly as recited in claim 1 wherein the housing comprises a thermally conductive sleeve conducting heat to the housing.

11. A method comprising:
    molding a mesh heat dissipation layer between an outer surface and inner surface of a lens cap to form a lens cap assembly;
    coupling a light source circuit board and a housing to the lens cap to form a light assembly;
    generating heat at the light source circuit board;
    communicating heat to the mesh through the lens cap which is disposed adjacent to the lens cap assembly and mesh therein;
    distributing heat throughout the lens cap assembly using the heat dissipation layer; and
    dissipating the heat from the light source circuit board through the mesh heat dissipation layer in the lens cap assembly.

12. The method as recited in claim 11 wherein molding the mesh heat dissipation layer between the outer surface and inner surface of the lens cap assembly comprises blow molding the mesh heat dissipation layer within the lens cap.

13. The method as recited in claim 11 further comprising assembling a control circuit board within a thermally conductive sleeve and electronically coupling the control circuit board to the light source circuit board.

14. The method as recited in claim 13 further comprising conducting heat from the thermally conductive sleeve to the mesh heat dissipation layer.

15. The method as recited in claim 13 further comprising conducting heat from the thermally conductive sleeve to the mesh heat dissipation layer through the housing.

16. The method as recited in claim 15 further comprising coupling the lens cap assembly to the housing.

17. The method as recited in claim 15 further comprising coupling the lens cap assembly to the housing using first threads on the lens cap and second threads on a retainer ring of the housing.

18. The method as recited in claim 15 further comprising coupling the lens cap assembly to the housing using a retainer ring of the housing.

19. The method as recited in claim 11 further comprising generating light at light sources of the light source circuit board and converting a first energy of the light into a second energy.

20. The method as recited in claim 11 further comprising generating light at light sources of the light source circuit board and converting a first energy of the light into a second energy using the mesh heat dissipation layer.

21. The method of claim 11 wherein combining comprises:
    inserting a mesh heat dissipation layer into a mold;
    inserting a lens cap preform into the mold; and
    expanding the preform so that the mesh is disposed within the lens cap to form the heat dissipation layer.

22. The method of claim 21 wherein combining comprises:
    coating the lens cap with nanoparticles to form the mesh heat dissipation layer.

* * * * *